United States Patent
Fries et al.

(10) Patent No.: US 6,639,039 B1
(45) Date of Patent: Oct. 28, 2003

(54) PHOTOCHROMIC COATING COMPOSITION COMPRISING NANOSCALES PARTICLES AND PROCESS FOR PROVIDING SUBSTRATE COATED WITH THE SAME

(75) Inventors: Kira Fries, Neunkirchen (DE); Lisong Hou, Shanghai (CN); Marion Pietsch, Laufersweiler (DE); Martin Mennig, Quierschied (DE); Helmut Schmidt, Saarbruecken-Guedingen (DE)

(73) Assignee: Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 09/601,423

(22) PCT Filed: Feb. 12, 1999

(86) PCT No.: PCT/EP99/00920

§ 371 (c)(1),
(2), (4) Date: Jul. 31, 2000

(87) PCT Pub. No.: WO99/41326

PCT Pub. Date: Aug. 19, 1999

(30) Foreign Application Priority Data

Feb. 13, 1998 (DE) .......................... 198 05 977

(51) Int. Cl.$^7$ .......................... C08G 77/20; G02B 5/23; B05D 5/06; B05D 3/00
(52) U.S. Cl. .......................... 528/32; 252/586; 427/162; 427/387
(58) Field of Search .................. 427/162, 164, 427/165, 169, 387; 252/582, 586, 588, 589; 524/866, 868; 528/32

(56) References Cited

U.S. PATENT DOCUMENTS

| | | | | |
|---|---|---|---|---|
| 3,212,898 A | * | 10/1965 | Cerreta ....................... 359/241 |
| 4,556,605 A | * | 12/1985 | Mogami et al. ............. 252/586 |
| 4,720,356 A | * | 1/1988 | Chu ............................ 252/586 |
| 4,756,973 A | * | 7/1988 | Sakagami et al. .......... 351/166 |
| 5,015,523 A | * | 5/1991 | Kawashima et al. ........ 427/162 |
| 5,462,806 A | * | 10/1995 | Konishi et al. ............. 428/204 |
| 5,624,757 A | * | 4/1997 | Smith ......................... 359/581 |
| 5,863,679 A | * | 1/1999 | Tsushima et al. ............ 430/14 |

OTHER PUBLICATIONS

Kwak et al., "Silica Sol–Gel Compositions Specifically Tailored for Acid–Sensitive Organic Photochromics," PPG Technol. J. (1996), 2(1), 45–49.*
Hou et al., "Enhancement of Photochromic Performance of Spirooxazine in Sol–Gel Derived Organic–Inorganic Hybrid Matrices by Additives," J. Sol–Gel. Sci. Technol. (1997), 8(1/2/3), 927–929.*
Hou et al., "Effect of Heat Treatment and Additives on the Photochromic and Mechanical Properties of Sol–Gel Derived Photochromic Coatings Containing Spirooxazine," J. Sol–Gel Sci. Technol. (1997), 8(1/2/3), 923–926.*
Definition of "plastic" from Hawley's Condensed Chemical Dictionary, 12th Edition, © 1993 by Van Nostrand Reinhold, Richard J. Lewis, Sr., editor, pp. 922–923.*
Kwak et al., "Silica Sol–Gel Compositions Specifically Tailored for Acid–Sensitive Organic Photochromics," PPG Technol. J. (1996), 2(1), 45–49.*
Hou et al., "Effect of Heat Treatment and Additives on the Photochromic and Mechanical Properties of sol–Gel Derived Photochromic Coatings Containing Spirooxazine," J. Sol–Gel Sci. Technol. (1997), 8(1/2/3), 923–926.*
PLASTIC Hawley's Condensed Chemical Dictionary, 12$^{th}$ ed., © 1993 by Van Nostrand Reinhold, Richard J. Lewis, Sr., ed., pp. 922–923.*

* cited by examiner

*Primary Examiner*—Bret Chen
*Assistant Examiner*—William Phillip Fletcher, III
(74) *Attorney, Agent, or Firm*—Heller Ehrman White & McAuliffe LLP

(57) ABSTRACT

A photochromic coating composition contains a silicon-containing precondensate derived from a hydrolysable silane containing a polymerizable functional group on a hydrolysis-stable radical, a photochromic dye, a stabilizer, and nanoscale particles. The coating composition, when applied to transparent plastic and glass substrates and cured, gives a coating having high light stability and good scratch resistance.

18 Claims, No Drawings

PHOTOCHROMIC COATING COMPOSITION COMPRISING NANOSCALES PARTICLES AND PROCESS FOR PROVIDING SUBSTRATE COATED WITH THE SAME

The present invention relates to photochromic coating compositions and to substrates provided therewith. In particular, the present invention relates to photo-chromic coating compositions which comprise, as essential components, a silicon-containing precondensate, at least one photochromic dye and at least one stabilizer (for example an antioxidant and/or a UV absorber). These coating compositions are particularly suitable for providing substrates made from (preferably transparent) plastics and mineral glasses with a hard, scratch-resistant coating having a long-term photochromic action.

Photochromic components or elements having excellent photochromic behaviour, in particular over long periods, are nowadays employed in a wide variety of areas, the best-known being the area of photochromic spectacle lenses. At present, these photochromic substrates are produced by providing corresponding plastics with organic photochromic substances by very complex and expensive processes. In general, such processes are not suitable for use on a large scale and in a wide variety of areas. Furthermore, C. Sanchez, in J. Mater. Chem. 7(1) (1997), 61–65, describes the incorporation of spiropyrans and spirooxazines into organic/inorganic matrices of diethoxydimethylsilane/zirconium propoxide and methyldiethoxysilane/triethoxysilane, but without investigating the light stability of these systems.

It has now been found, in accordance with the invention, that photochromic coating compositions which are simple and inexpensive to produce on the basis of certain silicon-containing precondensates, photochromic dyes and stabilizers are suitable for providing corresponding substrates with a remarkably hard and scratch-resistant coating which exhibits long-term photochromicity. Coating compositions of this type are suitable for a large number of applications, such as, for example, photochromic spectacle lenses, lenses for sunglasses, visors and ski goggles, but also for glazing of all types, in particular for decorative needs, buildings, automobiles and aircraft, in which a photochromic effect is desired (and which are exposed to varying irradiation with light (in particular sunlight)).

Accordingly, the present invention provides a photochromic coating composition which comprises, as essential components:

(a) a silicon-containing precondensate derived from at least one hydrolysable silane A containing at least one hydrolysis-stable radical R which has a functional group X which is capable of undergoing a thermally and/or photochemically induced (optionally catalysed) polymerization reaction, and optionally from one or more additional hydrolysable compounds of elements from the group consisting of Si, Al, Ti, Zr, Ta, Nb, Sn, Zn, W and Ge;

(b) at least one photochromic dye; and (c) at least one stabilizer, preferably selected from anti-oxidants and UV absorbers.

The above silane A usually contains at least one (and preferably a single) group X, which is an epoxide, mercapto or (meth)acrylyl group.

It is furthermore particularly preferred for the silane A to be selected from compounds of the following general formula (I):

$$R^1{}_x SiR^3{}_{(3-x)} R \quad \text{(I)}$$

in which the radicals $R^1$ are identical or different (preferably identical) and are selected from halogen atoms (in particular Cl and Br), (preferably $C_{1-4}$-)alkoxy groups and (preferably $C_{2-6}$-)acyl groups (the groups $R^1$ are particularly preferably methoxy or ethoxy groups); the radicals $R^3$ are a (preferably unsubstituted) alkyl or aryl radical (for example methyl, ethyl, propyl, butyl or phenyl), and x is 1, 2 or 3 (preferably 2 or 3).

The radical(s) R is (are) preferably selected from those of the following general formulae (II) and (III):

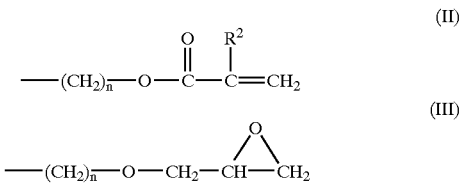

in which $R^2$ is hydrogen or methyl, and n is an integer from 1 to 6, preferably from 2 to 4, and in particular 3. However, the radical(s) R may also contain other functional groups and may optionally be fluorinated.

Specific examples of silanes A of this type are 3-glycidoxypropyltri(m)ethoxysilane and 3-(meth)acryloxypropyltri(m)ethoxysilane.

The photochromic dye (b) is preferably selected from the group consisting of the spirooxazines, spiropyrans, naphthopyrans (chromenes), fulgides and dihydroindolizines. Particular preference is given to photochromic dyes from the group consisting of the spirooxazines and naphthopyrans.

Suitable stabilizers which can be employed as component (c) in the present coating composition are all compounds which are capable of protecting the photochromic dyes (b) in a suitable manner against attack (for example decomposition) by radiation (in particular UV radiation) and/or (aggressive) chemical substances (oxygen, ozone, free radicals, etc.). Preferred examples thereof are antioxidants and UV absorbers.

The antioxidants which can be used as stabilizers in the coating composition according to the invention include the compounds known to the person skilled in the art as antioxidants. However, the antioxidant employed in accordance with the invention is preferably selected from the group consisting of phenols, hydroquinones, pyrocatechols and aromatic amines which are substituted by sterically hindered groups, and organic phosphites and phosphonates. The term "phenol" here is intended to cover not only monocyclic phenols, but also bicyclic (bisphenols), tricyclic (trisphenols) and polycyclic phenols and naphthols.

The UV absorbers which can be employed as stabilizers in the coating composition according to the invention include the compounds which are known to the person skilled in the art as UV absorbers. Preferred UV absorbers include derivatives of benzophenone, whose substituents (for example hydroxyl and/or alkoxy groups) are preferably in the 2- and/or 4-position; substituted benzotriazoles, 3-phenyl-substituted phenylacrylates (cinnamic acid derivatives) and salicylates.

Further UV absorbers which are preferred in accordance with the invention are natural products, such as 3-(5-imidazolyl)acrylic acid (urocanic acid) and ergosterol.

According to a preferred embodiment of the present invention, the coating composition according to the invention, besides the above essential components (a), (b)

and (c), also comprises nanoscale particles, which are preferably selected from the group consisting of the oxides, nitrides, carbides, silicides, borides and carbo-nitrides of Al, Si, Ti, Zr, Hf, W, Ga, Nb, Ta, Sn, Zn and Ge. In the present connection, the term "nanoscale particles" is taken to mean particles having a mean particle size of not greater than 200 nm, preferably not greater than 100 nm and particularly preferably not greater than 50 nm (for example up to 30 nm). The nanoparticles can also be employed in surface-modified form in order to prevent agglomeration of the particles. The surface modification is carried out here, for example, using epoxy-, amino-, mercapto- or (meth)acrylate-functional silanes; see, for example, DE-A-195 40 623.

Particularly preferred nanoscale particles for use in the present invention are those comprising $SiO_2$ (for example silica sols).

Nanoscale particles of this type are preferably used, if at all, in amounts of from 2 to 100% by weight of the precondensate (a) employed, a proportion of from 5 to 50% by weight being even more preferred.

Components (a), (b) and (c) of the present coating composition are preferably present in such amounts, based on the total weight of these components, that component (b) makes up from 0.05 to 5% by weight, preferably from 0.1 to 2% by weight, and component (c) makes up from 0.1 to 5% by weight, preferably from 0.5 to 2.5% by weight.

The present invention is explained in greater detail below with reference to preferred embodiments.

As already mentioned above, the silicon-containing precondensate to be employed in the coating composition according to the invention is preferably derived from at least one hydrolysable silane A containing an epoxide, mercapto or (meth)acrylate group X.

The epoxide-based formulation comprises a precondensate derived from a silane A containing an epoxide group X, and optionally one or more other components, which are preferably selected from purely organic compounds containing an epoxide group (preferably containing two or more epoxide groups), additional organic compounds containing functional groups which are reacted with epoxide groups, hydrolysable silanes containing alkyl or fluorinated alkyl groups, additional metal oxides, the abovementioned nanoscale particles, spacers and crosslinking agents. A surfactant is also optionally added to the coating formulation.

The most preferred epoxide-based silane A is 3-glycidoxypropyltrimethoxysilane. Specific examples of other preferred silanes containing an epoxide group are 3-glycidoxypropylmethyldiethoxysilane, 3-glycidoxypropyldimethylethoxysilane, 3-glycidoxypropyldimethylmethoxysilane, 3-glycidoxypropylmethyldimethoxysilane, 3,4-epoxybutyltrimethoxysilane and 2-(3,4-epoxycyclohexyl)ethyltrimethoxysilane.

Preferred examples of the abovementioned purely organic compounds containing an epoxide group are bisphenol A diglycidyl ether, 2,2-bis(4-(2,3-epoxypropoxy)cyclohexyl) propane, 1,4-butanediol diglycidyl ether, 3,4-epoxycyclohexylmethyl 3,4-epoxycyclohexanecarboxylate, 4-epoxyethyl-1,2-epoxycyclohexane, ethylene glycol diglycidyl ether, triglycidyl glycerol, cresyl glycidyl ether, neopentyl glycol diglycidyl ether, 1-(2,3-epoxypropoxy)-4-[N,N-bis(2,3-epoxypropyl)amino]benzene, bis(4-[N,N-bis(2,3-epoxypropyl)amino]phenyl)methane, triglycidyl isocyanurate, phenyl glycidyl ether, 5,5-dimethyl-1,3-bis(2,3-epoxypropyl)-2,4-imidazolidinedione, heptafluoropropyl-1,3-bis[2-(2,3-epoxypropoxy)hexafluoro-2-propyl]benzene, 2-(3,4-epoxycyclohexyl-5,5-spiro-3,4-epoxy)cyclohexane-meta-dioxane, styrene oxide, butadiene dioxide, divinylbenzene dioxide, diglycidyl ether, poly(propylene glycol) bis (2,3-epoxypropyl ether), bis(3,4-epoxycyclohexyl) adipate, 3-bis[(2,3-epoxypropoxymethyl)methoxy]-1,2-propanediol, 1,4-bis(hydroxymethyl)cyclohexane bis(2,3-epoxypropyl ether) and hexahydrophthalic acid diglycidyl ether. Particularly preferred compounds from said group are cycloaliphatic or aliphatic compounds, such as 3,4-epoxycyclohexylmethyl 3,4-epoxycyclohexanecarboxylate and bis-3,4-epoxycyclohexyl adipate. These compounds are particularly preferred owing to their improved UV stability compared with aromatic compounds.

Organic compounds, such as, for example, phenols, can be introduced into the coating composition as spacers. The most frequently employed compounds for this purpose are bisphenol A, (4-hydroxyphenyl)adamantane, hexafluorobisphenol A, 2,2-bis(4-hydroxyphenyl)perfluoropropane, 9,9-bis(4-hydroxyphenyl)fluorenone, 1,2-bis-3-(hydroxyphenoxy)ethane, 4,4'-hydroxyoctafluorobiphenyl and tetraphenolethane.

The modification with alkyl-substituted alkoxysilanes can be carried out, for example, using the following compounds: tetramethoxysilane, tetraethoxysilane, tetra-n-propoxysilane, tetra-n-butoxysilane, cyclohexyltrimethoxysilane, cyclopentyltrimethoxysilane, ethyltrimethoxysilane, phenylethyltrimethoxysilane, phenyltrimethoxysilane, n-propyltrimethoxysilane, cyclohexylmethyldimethoxysilane, dimethyldimethoxysilane, diisopropyldimethoxysilane, phenylmethyldimethoxysilane, phenylethyltriethoxysilane, phenyltriethoxysilane, phenylmethyldiethoxysilane and phenyldimethylethoxysilane.

Fluorinated silanes are introduced into the coating composition in particular if a low surface energy of the coating, which results in dirt- and water-repellent properties, is desired. Examples of silanes which are suitable for this purpose are those which contain directly silicon-bonded, fluorinated alkyl radicals having at least four carbon atoms, the carbon atoms in the α- and β-position to the silicon preferably carrying no fluorine atoms, for example (tridecafluoro-1,1,2,2-tetrahydrooctyl) methyldiethoxysilane, (tridecafluoro-1,1,2,2-tetrahydrooctyl)triethoxysilane, (heptadecafluoro-1,1,2,2-tetrahydrodecyl)methyldiethoxysilane and (heptadecafluoro-1,1,2,2-tetrahydrodecyl)triethoxysilane.

Examples of other hydrolysable compounds which can be used for the preparation of the silicon-containing precondensate (a) are, in particular, the alkoxides (preferably containing $C_{1-4}$-alkoxy groups) of aluminium, titanium, zirconium, tantalum, niobium, tin, zinc, tungsten and germanium. Specific examples of compounds of this type are aluminium sec-butoxide, titanium isopropoxide, titanium propoxide, titanium butoxide, zirconium isopropoxide, zirconium propoxide, zirconium butoxide, zirconium ethoxide, tantalum ethoxide, tantalum butoxide, niobium ethoxide, niobium butoxide, tin t-butoxide, tungsten(VI) ethoxide, germanium ethoxide, germanium isopropoxide and di-sec-butoxyaluminotriethoxysilane.

In particular in the case of the more reactive alkoxides (for example of Al, Ti, Zr, etc.), it may be advisable to employ these in complexed form, examples of suitable complexing agents being, for example, unsaturated carboxylic acids and β-dicarbonyl compounds, such as, for example, methacrylic acid, acetylacetone and ethyl acetoacetate.

The incorporation already mentioned above of nanoscale inorganic particles into the coating composition results in improved scratch resistance and stability of the resultant coating and also allows the production of relatively thick coatings. In addition, the refractive index of the coating can be adjusted in this way. Examples of nanoscale particles which are suitable in accordance with the invention are those comprising $SiO_2$, $ZrO_2$, $TiO_2$, $HfO_2$, $GeO_2$, $Nb_2O_5$, $Ta_2O_5$, $SnO_2$, $Al_2O_3$, ZnO and $GeO_2$, those comprising $SiO_2$ being particularly preferred.

The epoxide-based coatings are preferably cured thermally. Crosslinking agents which are suitable for this purpose are, in particular, imidazoles, amines and acid anhydrides. If imidazoles are to be employed as crosslinking agent, 1-methylimidazole is particularly preferred. Other preferred examples of imidazole crosslinking agents are 2-methylimidazole and 2-phenylimidazole. Examples of crosslinking agents from the group consisting of primary, secondary and tertiary amines are ethylenediamine, diethylenetriamine, triethylenetetramine, 1,6-diaminohexane, 1,6-bis(dimethylamino)hexane, tetramethylethylenediamine, N,N,N',N'',N''-pentamethyldiethylenetriamine, 1,4-diazabicyclo[2.2.2] octane, cyclohexane-1,2-diamine, 2-(aminomethyl)-3,3,5-trimethylcyclopentylamine, 4,4'-diaminocyclohexylmethane, 1,3-bis(aminomethyl) cyclohexane, bis(4-amino-3-methylcyclohexyl)methane, 1,8-diamino-p-menthane, 3-(aminoethyl)-3,3,5-trimethylcyclohexylamine (isophoronediamine), piperazine, piperidine, urotropin, bis(4-aminophenyl)methane and bis (4-aminophenyl) sulphone. The amines employed as crosslinking agent may also be functionalized with silanes. Examples thereof are N-(2-aminoethyl)-3-aminopropyltriethoxysilane, N-(2-aminoethyl)-3-aminopropyltrimethoxysilane, aminopropyltrimethoxysilane and aminopropyltriethoxysilane. In addition, boron trifluoride adducts of amines, such as, for example, $BF_3$/ethylamine, can be employed. Furthermore, the crosslinking and curing can be accomplished with the aid of acid anhydrides (preferably in combination with tertiary amines), such as methylbicyclo[2.2.1]heptene-2,3-dicarboxylic anhydride, hexahydronaphthylenedicarboxylic anhydride, phthalic anhydride and 1,2-cyclohexanedicarboxylic anhydride.

As mentioned above, a surfactant can also be added to the coating formulation. This prevents aggregation of the dye molecules in the coating. Furthermore, it is of course also possible to add organic solvents to the coating composition in order to match its viscosity to the requirements of the coating method employed (for example dipping, spraying, brushing, spin coating, etc.).

A further preferred coating composition is one based on acrylate or methacrylate, i.e. one which comprises a precondensate based on a silane A containing a (meth)acrylate group X. A coating composition of this type can be prepared using the same additional materials as already described above in connection with the epoxide-based coating composition.

Specific (and preferred) examples of silanes A containing a (meth)acrylate group X are 3-(meth) acryloxypropyltrimethoxysilane, 3-(meth) acryloxypropylmethyldimethoxysilane, 2-(meth) acryloxyethyltrimethoxysilane and 2-(meth) acryloxyethylmethyldimethoxy-silane. Of these, 3-methacryloxypropyltrimethoxysilane is particularly preferred.

Example of components which can be used as spacers in the case of (meth)acrylate-based coating compositions are bisphenol A bisacrylate, bisphenol A bismethacrylate, trimethylolpropane triacrylate, trimethylolpropane trimethacrylate, neopentyl glycol dimethacrylate, neopentyl glycol diacrylate, diethylene glycol diacrylate, diethylene glycol dimethacrylate, triethylene glycol diacrylate, diethylene glycol dimethacrylate, tetraethylene glycol diacrylate, tetraethylene glycol dimethacrylate, polyethylene glycol diacrylate, polyethylene glycol dimethacrylate, 2,2,3,3-tetrafluoro-1,4-butanediol diacrylate and dimethacrylate, 1,1,5,5-tetrahydroperfluoropentyl 1,5-diacrylate and -dimethacrylate, hexafluorobisphenol A diacrylate and dimethacrylate, octafluorohexanediol 1,6-diacrylate and -dimethacrylate, 1,3-bis(3-methacryloxypropyl)tetrakis (trimethylsiloxy)disiloxane, 1,3-bis(3-acryloxypropyl) tetrakis(trimethylsiloxy)disiloxane, 1,3-bis(3-methacryloxypropyl)tetramethyldisiloxane and 1,3-bis(3-acryloxypropyl)tetramethyldisiloxane.

The (meth)acrylate-based coating compositions are preferably cured with the aid of thermal catalysts. Examples thereof are the conventional thermal polymerization initiators, such as, for example, azobisisobutyronitrile, diacyl peroxides (for example dibenzoyl peroxide and dilauroyl peroxide), peroxodicarbonate, alkyl peresters, perketals, alkyl or aryl peroxides, ketone peroxides and hydroperoxides.

Component (a) of the coating composition according to the invention can be obtained, for example, by a process as described, for example, in "Journal of Sol-Gel Science and Technology" (1994), Volume 2, pp. 635–639.

The nanoscale particles preferably employed can be added in the form of wettable powders or in the form of colloidal suspensions and in surface-modified form.

It has been found in accordance with the invention that the switching kinetics of the conversion from the colourless state into the coloured state of the photochromic materials can be controlled (in general slowed) via the concentration of the crosslinking agent and/or through variation of the type of crosslinking agent or spacer used.

In order to achieve effective retardation of the switching kinetics, from 1 to 50 mol %, preferably from 10 to 30 mol %, of crosslinking agent are usually employed per functional group of the network-forming components and spacers.

As an alternative to or in combination with the crosslinking agent concentration, the switching kinetics of the photochromic dyes in the matrix can be adjusted through variation of the type of crosslinking agent and/or type of spacer (polar). In this case, stepless adjustment up to multiple values are achieved in comparison with the kinetics in ethanolic solution.

The term "polar spacers" here is taken to mean organic compounds containing at least two functional groups (epoxide, (meth)acrylyl, mercapto, vinyl, etc.) at the molecule ends, which, owing to the incorporation of aromatic or heteroaromatic groups (such as phenyl, benzyl, etc.) and heteroatoms (such as O, S, N, etc.), have polar properties and can undergo a polar interaction with the photosubstances.

The polar spacers are usually employed in a molar ratio to the network-forming components of up to 3:1, preferably of up to 1:1.

Examples of the abovementioned polar spacers are the following:

a) based on epoxide:
poly(phenyl glycidyl ether)-co-formaldehyde, bis(3,4-epoxycyclohexylmethyl) adipate, 3-[bis(2,3-epoxypropoxymethyl)methoxy]-1,2-propanediol, 4,4-methylenebis-(N,N-diglycidylaniline), bisphenol A diglycidyl ether, N,N-bis(2,3-epoxypropyl)4-(2,3-epoxypropoxy)aniline, 3,4-epoxycyclohexylmethyl (3,4- epoxycyclohexanecarboxylate), glycerol propoxide triglycidyl ether, diglycidyl hexahydrophthalate, tris(2,3-epoxypropyl) isocyanurate, poly(propylene glycol) bis(2,3-epoxypropyl ether), 4,4'-bis(2,3-epoxypropoxy)biphenyl b) based on methacrylate and acrylate:
   bisphenol A dimethacrylate, tetraethylene glycol dimethacrylate, 1,3-diisopropenylbenzene, divinylbenzene, diallyl phthalate, triallyl 1,3,5-benzenetricarboxylate, 4,4'-isopropylidenediphenol dimethacrylate, 2,4,6-triallyloxy-1,3,5-triazine, 1,3-diallylurea, N,N'-methylenebisacrylamide, N,N'-ethylenebisacrylamide, N,N'-(1,2-dihydroxyethylene)bisacrylamide, (+)-N,N'-diallyltartaramide, methacrylic anhydride, tetraethylene glycol diacrylate, pentaerythritol triacrylate, diethyldiallyl malonate, ethylene diacrylate, tripropylene glycol diacrylate, ethylene glycol dimethacrylate, triethylene glycol dimethacrylate, 1,4-butanediol dimethacrylate, 1,6-hexanediol diacrylate, 2-ethyl-2-(hydroxymethyl)-1,3-propanediol trimethacrylate, allyl methacrylate, diallyl carbonate, diallyl succinate, diallyl pyrocarbonate.

The preferred photochromic compounds (b) employed for the purposes of the present invention are photochromic compounds which belong to the class of the spirooxazines or naphthopyrans (chromenes).

Examples of particularly preferred photochromic compounds which belong to the class of the spirooxazines are those of the following general formula (IV):

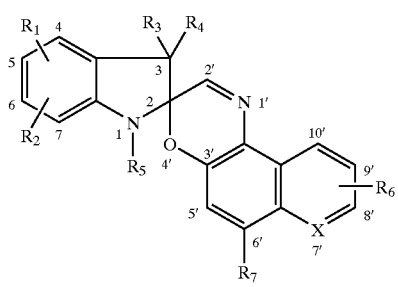

(IV)

in which
  $R_1$ and $R_2$, identical to or different from one another, are hydrogen, halogen (for example chlorine, bromine or fluorine), $C_{1-5}$-alkoxy, nitro, cyano or linear or branched $C_{1-5}$-alkyl (optionally with one or more substituents from the group consisting of the halogen atoms, such as chlorine, bromine and fluorine, $C_{1-5}$-alkoxy, $C_{1-5}$-alkylthio, $C_{1-5}$-carboxyalkyl and cyano groups); and
  $R_1$ and $R_2$ can be linked to any of the 4-, 5-, 6- and 7-positions of the indoline unit;
  $R_3$ and $R_4$, independently of one another, are a linear or branched $C_{1-5}$-alkyl group, a phenyl group or a benzyl group; or
  $R_3$ and $R_4$, together with the carbon atom to which they are linked, can form a $C_{4-8}$-cycloalkyl group;
  $R_5$ is a phenyl group, benzyl group or allyl group or a linear or branched $C_{1-5}$-alkyl group, which may optionally be substituted by one or more halogen atoms (for example chlorine, bromine or fluorine) and/or one or more $C_{1-5}$-alkoxy groups, $C_{1-5}$-alkylthio groups, $C_{1-5}$-carboxyalkyl groups or cyano groups;

$R_6$ is a hydrogen atom, halogen atom (such as, for example, chlorine, bromine or fluorine) or a group selected from the following: $C_{1-5}$-alkoxy groups, $C_{1-5}$-alkylthio groups, $C_{1-5}$-carboxyalkyl groups, nitro groups and cyano groups; and linear or branched $C_{1-5}$-alkyl groups, which may optionally be substituted by one or more halogen atoms, such as, for example, chlorine, bromine or fluorine, and/or one or more $C_{1-5}$-alkoxy groups, $C_{1-5}$-alkylthio groups, $C_{1-5}$-carboxyalkyl groups and cyano groups; or $R_6$ is a fused aromatic or heterocyclic ring; and
$R_6$ can be located in any of the 7'-, 8'-, 9'- and 10'-positions of the naphthalene radical if it is not hydrogen or a fused aromatic or heterocyclic ring;

$R_7$ is hydrogen or an —$NR_8R_9$ group, in which $R_8$ and $R_9$, independently of one another, are a hydrogen atom, a linear or branched $C_{1-5}$-alkyl group, a phenyl group or a benzyl group; or $R_8$ and $R_9$, together with the nitrogen atom to which they are linked, form a monocyclic or polycyclic structure having 5 to 12 members, which optionally contains a further heteroatom selected from nitrogen and oxygen; and X is CH or N.

Preferred photochromic compounds from the class of the spirooxazines which are suitable for use in the present invention are those containing the following substituents in the general formula (IV):

$R_1$ and $R_2$, independently of one another, are hydrogen or a methyl group;
$R_3$ and $R_4$ are both a methyl group or together form a cyclohexyl group;
$R_5$ is a methyl group;
$R_7$ is a hydrogen atom or an —$NR_8R_9$ group, in which $R_8$ and $R_9$, together with the nitrogen atom to which they are linked, form a piperidyl, morpholyl, pyrrolidyl or hexamethyleneamine ring;
$R_6$ is a hydrogen atom, a nitro group or an oxomethyl, oxoethyl or oxophenyl group; and
X is CH.

Specific examples of compounds of the above formula (IV) are 1,3,3-trimethyl-6'-piperidinospiro[indolino-2,3-(3H)naphtho(2,1-b)(1,4)oxazine], which is available under the trade name Variacrol Red PNO from Great Lakes Chemical Italia S.r.l. and has the following formula:

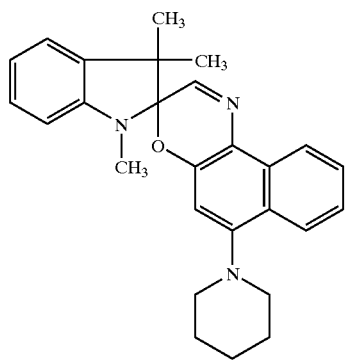

and 1,3,3-trimethylspiro[indolino-2,3-(3H)naphtho(2,1-b)(1,4)oxazine], which is available under the tradename Variacrol Blue A from Great Lakes Chemical Italia S.r.l. and has the following formula:

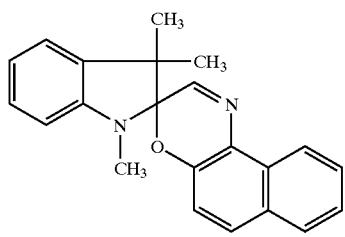

Examples of photochromic compounds which belong to the class of the chromenes (naphthopyrans) and are useful for the purposes of the present invention are those having the following general formula (V):

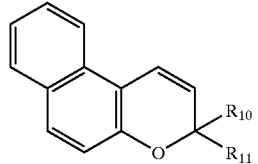

(V)

in which

R$_{10}$ and R$_{11}$, independently of one another, are a hydrogen atom, a linear or branched C$_{1-5}$-alkyl group, a phenyl group, which may be substituted by 1 to 5 halogen atoms (for example fluorine, chlorine or bromine), or a cyclopropyl group; or R$_{10}$ and R$_{11}$ together form an alicyclic C$_5$- or C$_6$-group or an adamantyl group.

Preferred photochromic compounds from the above class of the chromenes are those of the general formula (V) in which R$_{10}$ and R$_{11}$ are an unsubstituted phenyl group.

A specific example of a photochromic compound from the class of the chromenes having the above formula (V) is 2,2-diphenyl-5,6-benzo(2)chromene, which is available under the tradename Variacrol Photo L from Great Lakes Chemical Italia S.r.l. and has the following formula:

Antioxidants and UV absorbers which can be employed in accordance with the invention as stabilizers have already been mentioned above. Specific examples thereof are 2,6-di-tert-butyl-4-methylphenol (BHT), bis(3,5-di-tert-butyl-4-hydroxyphenyl)methane (BDPM), tetrafluorohydroquinone, ergosterol and urocanic acid and (optionally) substituted triphenylphosphites (for example trinonylphenyl phosphite (TNPP)).

It is of course also possible for other stabilizers to give particularly desirable results, depending on the specific circumstances. Examples of such stabilizers are N,N'-disubstituted p-phenylenediamines, diphenylamine derivatives, aminophenol derivatives, phenylbenzylureas, aldehyde-amine condensation products (for example heterocyclic compounds), ketone-amine condensation products (for example heterocyclic compounds), sulphur compounds, such as mercaptans (alkylmercaptans, mercaptobenzimidazole), thioethers (thiobisphenols, thiobisalkanecarboxylic acid esters), disulphides (for example dialkyl sulphides), dithiocarbamates, derivatives of dithiophosphoric acid, thiobisphenols, sulphur-containing amines, tocopherol, octyl and dodecyl gallate, ascorbic acid, lactic acid, citric acid and tartaric acid and their salts, and the like.

The preparation of a photochromic coating composition according to the invention will be illustrated below with reference to a specific example using 3-glycidoxypropyltrimethoxysilane as silane A.

The preparation begins with a 2-step pre-hydrolysis of 3-glycidoxypropyltrimethoxysilane (GPTMS) using dilute hydrochloric acid at room temperature. A solution of bisphenol A in ethyl alcohol is added to the pre-hydrolysed GPTMS at room temperature with stirring, after which 1-methylimidazole is added. The mixture is then stirred at room temperature for a further 1 hour. After the addition of the photochromic compound, the stabilizer and a surfactant in order to achieve better dispersion of the photochromic compound, the mixture is stirred for a further 30 minutes, which gives a solution which is suitable for coating of plastic and glass articles.

If organic epoxide compounds, other silane compounds, alkoxides of elements other than silicon and/or inorganic nanoscale particles and the like are to be additionally introduced into the coating composition, modified synthetic methods are employed, if necessary. For example, additional silane components can, with the exception of fluoroalkylsilane compounds, be subjected to pre-hydrolysis together with the epoxide-based silanes. Additional epoxides, such as bis(3,4-epoxycyclohexyl) adipate or 3,4-epoxycyclohexylmethyl 3,4-epoxycyclohexane carboxylate, and organic compounds other than bisphenol A can then be added. If trialkoxysilanes containing a fluorinated alkyl group are to be introduced into the coating composition, these silanes are preferably added after the other silane components have been prehydrolysed. Two phases thus form. The amount of water necessary for semi-stoichiometric hydrolysis of the fluorinated alkoxysilanes is then added, and the mixture is stirred at least until it only exhibits one phase. This process ensures homogeneous distribution of the fluorinated silane and is particularly recommended since fluorinated alkoxysilanes generally hydrolyse more quickly than the other silane components employed. If desired, alkoxides of other elements can be added to the coating composition. In the case of alkoxides which hydrolyse more rapidly than comparable silicon compounds, these are preferably employed in the form of complexed precursors in order to prevent precipitation of the corresponding oxides during the hydrolysis. As already mentioned above, complexing agents which are suitable for this purpose are, for example, methacrylic acid, acetylacetone and ethyl acetate.

Nanoscale particles, such as, for example, those mentioned above, can be added to the coating composition in order to provide the coating with additional hardness. In order to prevent agglomeration of the particles in the coating sol, the surfaces of the particles are preferably modified by means of suitable stabilizers. Preferred nanoscale particles introduced into the coating composition are those which are commercially available in the form of wettable powders or colloidal solutions in alcohols. Particularly suitable for the aims of the present invention are SiO$_2$ particles in methanol and isopropanol, which are commercially available from Nissan Chemical (MA-ST, IPA-ST). The nanoscale particles are preferably added to the coating composition after pre-hydrolysis of silane A. The alcoholic SiO$_2$ sol, to which an additional sol stabilizer (for example tetrahexylammonium hydroxide) has been added, is mixed with the pre-hydrolysed epoxysilane, and all or some of the solvent is then stripped off under reduced pressure. In a preferred procedure, a mixture of nanoscale particles in silane A (for example based on epoxide) is firstly prepared separately, and the suitable amount of the nanoscale particles in this form is then added to the pre-hydrolysed silane component(s) of the coating composition.

The coating compositions applied to the substrates can be cured by means of a multiplicity of possible curing agents, as already indicated above. In the case of epoxysilanes, amines are preferred since they result in lower curing temperatures compared with anhydrides. If imidazoles are employed as curing agent, 1-methyl-imidazole is particularly preferred. Further curing agents which are particularly suitable for the purposes of the present invention are aliphatic and cycloaliphatic amines. Aliphatic amines containing primary amino groups are very reactive and result in short pot lives. For this reason, cycloaliphatic amines, such as isophoronediamine or menthanediamine, and tertiary amines, such as tetramethylethylenediamine, are particularly preferred. Since these compounds are more reactive than the imidazoles, they are wherever possible not added to the coating composition until just before the coating operation.

If desired, the coating formulation can be diluted with solvents, for example alcohols, such as methanol and ethanol, or tetrahydrofuran, in order to match the viscosity of the coating composition to the requirements of the specific coating process employed.

Naturally, in the case of silanes A containing (meth) acrylate groups and other silanes containing suitable groups X, analogous processes to those just outlined for the case of the epoxysilanes can be employed for the preparation of the coating composition.

As already mentioned above, the coating compositions prepared are applied to the corresponding substrates in the manner which is conventional to the person skilled in the art and subsequently cured thermally and/or photochemically, depending on the presence of functional groups and the curing catalysts. Particular preferred coating methods are dipping, roll coating, spray coating and spin coating.

The coating composition according to the invention is particularly suitable for providing (preferably transparent) substrates made from plastic or glass with a photochromic coating. Examples of such substrates are spectacle lenses, sunglasses, optical lenses, building, automobile and aircraft glazing, visors for helmets (for example for motorcyclists and skiers). Further suitable substrates are paper, textiles, metal, wood, stone and ceramic.

The coating compositions according to the invention are more specifically suitable, for example, for the following applications:

for glazing and windows of means of transport of all types (ships, rail vehicles, automobiles, aircraft), as complete or partial coating and on laminatable films which can be applied to the windows;

for interior and exterior architectural glazing made from glass and plastic, including room dividers (computer workstations, cultural centres, such as museums, concert halls and exhibition rooms, public buildings, private dwellings, greenhouses);

coatings on films of all types (roller blinds, laminatable films, packaging material for, for example, gifts and plants, best-by date seals in packaging);

for visual aids and as sight and dazzle protection (spectacles, sunglasses, sports goggles, helmet visors, contact lenses, magnifying glasses, reading aids);

for marking paper (banknotes, documents), identity cards, credit and cheque cards and other valuables;

for optical elements with self-regulating transmission (lenses, graduated lenses, filters, lenses for photographic equipment, telescopes, video cameras, film cameras);

as decoration elements on lamps, textiles, such as clothing, textile applications outside, such as sunshades and tents, furniture, sanitary articles, toys, joke articles, facades, vehicles (photochromic paint);

as decorative elements on wall coverings, paints, stage sets;

as decorative elements in the paper industry (greetings cards, letterheads, labelling, attachment of advertising;

for products made from ceramic and porcelain (tiles, crockery, ornamental figures);

in art (paintings, pictures, sculptures, design of special effects);

as decorative elements for ornaments and jewellery (photochromic wigs, back-lining of gemstones or imitation gemstones, fashion jewellery, such as, for example, glass pearl necklaces);

in cosmetics (hair lacquer, nail varnish, lipstick);

in shops for displays, special offers, etc.;

as interlayer between two glass sheets;

for temporary masks.

The following examples serve for further explanation of the present invention.

EXAMPLE 1

A mixture of 236.34 g (1 mol) of 3-glycidoxypropyltrimethoxysilane (GPTMS) and 27.122 g of 0.1 N hydrochloric acid was pre-hydrolysed for 2 hours at room temperature with stirring.

The photochromic dye 1,3,3-trimethylspiro[indolino-2,3-(3H)naphtho(2,1-b)-1,4-oxazine] (0.136 g; 0.415 mmol) was added to a mixture of 10.54 g of the above prehydrolysate and 2.52 g of bis(epoxycyclohexyl)methyl carboxylate, and the resultant mixture was stirred at room temperature for ½ hour until the dye had dissolved. 0.286 g of one of the antioxidants or UV absorbers indicated in the following tables was then added, after which the mixture was stirred at room temperature for a further 15 minutes. Finally, 1.02 g of crosslinking agent (isophoronediamine) were added, and the mixture was then stirred for 5 minutes.

After filtration through a filter having a pore size of 1.0 $\mu$m, the resulting coating composition was applied to glass microscope specimen slides with the aid of a dipping process. The coated slides were treated at a temperature of from 80 to 110° C. for from 1 to 6 hours in an electric oven.

EXAMPLE 2

The photochromic dye employed in Example 1 in the amount indicated in Example 1 was added to a mixture of 5.27 g of the prehydrolysate described in Example 1 and 4.26 g of a mixture of GPTMS and nanoscale $SiO_2$ particles (3.3% by weight of $SiO_2$, based on the GPTMS mixture), and 2.52 g of bis(epoxycyclohexyl)methyl carboxylate, and the mixture was then stirred at room temperature for ½ hour until the dye had dissolved. The remainder of the procedure was as in Example 1.

The glass specimen slides produced as above were employed for UV spectroscopic measurements. Both the photochromic response ($\Delta A_0$) and the fade half-value time ($t_{0.5}$) were determined using a UV spectrophotometer (HP 8453 UV-VIS) with a power of 5 mW/cm² and a darkening time of 20–25 seconds.

Furthermore, the scratch hardness of the resulting coating was determined with the aid of a modified Vicker test.

The results obtained are shown in Table 1 below. The following abbreviations are used in this table:

TNPP=tris(p-nonylphenyl) phosphite
BHT=2,6-di-tert-butyl-4-methylphenol
BDPM=bis(3,5-di-tert-butyl-4-hydroxyphenyl)methane The UV absorbers of the Tinuvin® and Cyasorb® type contain benzotriazole and benzophenone derivatives respectively.

TABLE 1

Measured photochromic response ($\Delta A_0$), fade half-value time ($t_{0.5}$) and scratch hardness of organic/inorganic composite coatings containing the photochromic dye 1,3,3-trimethylspiro[indolino-2,3-(3H)naphtho-(2,1-b)-1,4-oxazine] and a stabilizer

| Stabilizers | | Measurement results | | |
|---|---|---|---|---|
| Antioxidant | UV absorber | $\Delta A_0$ | $t_{0.5}$ [s] | Scratch hardness [g] |
| TNPP | \ | 0.655 | 2.8 | 10 |
| BDPM | \ | 0.579 | 2.8 | 10 |
| BHT | \ | 0.531 | 2.8 | 10 |
| BHT/SiO$_2$ | \ | 0.730 | 2.0 | 15 |
| Tetrafluoro-hydroquinone | \ | 0.538 | 2.2 | 33 |
| \ | Ergosterol | 0.656 | 2.6 | 10 |
| \ | Urocanic acid | 0.555 | 2.0 | 18 |
| \ | Urocanic acid/SiO$_2$ | 0.477 | 2.0 | 37 |
| \ | Tinuvin 326/SiO$_2$ | 0.175 | 1.6 | 16 |
| \ | Tinuvin 327/SiO$_2$ | 0.184 | 1.8 | 20 |
| \ | Tinuvin 328/SiO$_2$ | 0.219 | 2.0 | 15 |
| \ | Cyasorb UV 5411/SiO$_2$ | 0.211 | 1.8 | 18 |

The light stability of the corresponding coatings was determined with the aid of UV irradiation using a corresponding apparatus with a power of 75 mW/cm² (Heraeus Suntest CPS). The results obtained are shown in Table 2 below.

TABLE 2

Suntest investigations of organic/inorganic composite coatings containing the photochromic dye 1,3,3-trimethylspiro[indolino-2,3-(3H)naphtho(2,1-b)-1,4-oxazine] and a stabilizer. The indicated time in hours corresponds to the time in the suntest by which the sample is reduced to 50% of the original photochromic response ($\Delta A_0$).

| Stabilizers | | Measurement results Suntest time for the photochromic response to drop to 50% |
|---|---|---|
| Antioxidant | UV absorber | |
| TNPP | \ | 30 h |
| BDPM | \ | 25 h |
| BHT | \ | 27 h |
| BHT/SiO$_2$ | \ | 86 h |
| Tetrafluoro-hydroquinone | \ | 53 h |
| \ | Ergosterol | 31 h |
| \ | Urocanic acid | 49 h |
| \ | Urocanic acid/SiO$_2$ | 112 h |
| \ | Tinuvin 326/SiO$_2$ | 132 h |
| \ | Tinuvin 327/SiO$_2$ | 120 h |
| \ | Tinuvin 328/SiO$_2$ | 133 h |
| \ | Cyasorb UV 5411/SiO$_2$ | 133 h |

After storage in the dark at room temperature for about 4 weeks, some of the samples were re-investigated with respect to their light stability. The results are shown in Table 3 below.

TABLE 3

Suntest investigations of organic/inorganic composite coatings containing the photochromic dye 1,3,3-trimethylspiro[indolino-2,3-(3H)naphtho(2,1-b)-1,4-oxazine] and a stabilizer after storage in the dark for about four weeks. The indicated time in hours corresponds to the time in the suntest by which the sample is reduced to 50% of the original photochromic response ($\Delta A_0$).

| Stabilizers | | Measurement results Suntest time for the photochromic response to drop to 50% |
|---|---|---|
| Antioxidant | UV absorber | |
| TNPP | \ | 52 h |
| BDPM | \ | 47 h |
| BHT | \ | 52 h |
| BHT/SiO$_2$ | \ | 108 h |
| Tetrafluorohydroquinone | \ | 112 h |
| \ | Ergosterol | 68 h |
| \ | Urocanic acid | 74 h |
| \ | Urocanic acid/SiO$_2$ | 152 h |

EXAMPLE 3

0.25% by weight of photosubstance, based on the total amount of sol, were dissolved in a mixture of 6.58 g (0.025 mol) of GPTMS prehydrolysate (Example 1) and 1.04 g (0.005 mol) of TEOS (tetraethoxysilane) with stirring at room temperature. x mol % of the crosslinking agent IDA (isophoronediamine) per epoxide function were then added, and the mixture was stirred for approximately a further 5 minutes. x here was 10, 15, 20, 25 and 30.

EXAMPLE 4 y mol of the spacer PCF (poly(phenyl glycidyl ether)-co-formaldehyde, M≈345 g/mol, 2.2 epoxide groups per molecule) were added with stirring to a mixture of 6.58 g (0.025 mol) of GPTMS prehydrolysate (Example 1) and 1.04 g (0.005 mol) of TEOS, and 0.25% by weight of photosubstance, based on the total amount of sol, were then dissolved in the mixture with stirring at room temperature. 10 mol % of the crosslinking agent IDA per epoxide function were subsequently added, and the mixture was stirred for approximately a further 5 minutes. y here was 0, 0.005, 0.01, 0.015, 0.02 and 0.025.

EXAMPLE 5

The batches obtained in Examples 3 and 4 were, after filtration through a filter having a pore size of 1.0 µm, applied to glass microscope specimen slides by flooding. The coated slides were treated for 2 hours at a temperature of 130° C. in an electric oven.

The kinetic study of the coatings was carried out using an HP 8453 UV-VIS spectrophotometer at 25° C., with the UV light source used being an XBO 450 W/1 xenon lamp.

The results obtained are shown in the following tables. The following abbreviations are used in these tables:

| | |
|---|---|
| Blue A: | 1,3-dihydro-1,3,3-trimethylspiro[2H-indole-2,3'-[3H]-naphth(2,1-b)(1,4)-oxazine] |
| CL1: | 5-chloro-1,3-dihydro-1,3,3-trimethylspiro[2H-indole-2,3'-[3H]-naphth(2,1-b)(1,4)oxazine] |
| CL2: | 5-chloro-1,3-dihydro-1,3,3-trimethylspiro[2H-indole-2,3'-[3H]-phenanthr(9,10-b)(1,4)-oxazine] |
| PC3: | 1,3-dihydro-1,3,3-trimethylspiro[2H-indole-2,3'-[3H]-phenanthr(9,10-b)(1,4)-oxazine] |
| Photo L: | 3,3-diphenyl-[2H]-naphthopyran |
| Blue D: | 1,3-dihydro-1,3,3,5,6-pentamethylspiro[2H-indole-2,3'-[3H]-naphth(2,1-b)(1,4)-oxazine] |
| Red PNO: | 1,3-dihydro-1,3,3-trimethyl-6'-piperidinospiro[2H-indole-2,3'-[3H]-naphth(2,1-b)(1,4)-oxazine] |
| IDA: | isophoronediamine |
| PCF: | poly(phenyl glycidyl ether)-co-formaldehyde, M ≈ 345 g/mol, 2.2 epoxide groups per molecule |
| $t_A$: | half value time for brightening of a photosubstance |
| $t_E$: | half value time for darkening of a photosubstance |

TABLE 4

Dependence of the half value time for the brightening of the various photosubstances and coatings on glass (compacted for 2 h at 130° C.) on the amount of crosslinking agent

| Photosubstance | | 10 mol % IDA | 15 mol % IDA | 20 mol % IDA | 25 mol % IDA | 30 mol % IDA |
|---|---|---|---|---|---|---|
| Blue A | $t_A$: | 1.6 s | 2.8 s | 6.0 s | 9.0 s | 20.0 s |
| Cl1 | $t_A$: | 1.2 s | 3.6 s | 9.6 s | 16.0 s | 27.0 s |
| PC3 | $t_A$: | 1.8 s | 2.4 s | 5.0 s | 10.0 s | 22.1 s |
| Cl2 | $t_A$: | 3.0 s | 6.0 s | 12.0 s | 20.0 s | 40.0 s |
| Photo L | $t_A$: | 7.2 s | 10.4 s | 15.0 s | 20.4 s | 32.0 s |
| Blue D | $t_A$: | 6.0 s | 9.6 s | 16.0 s | 32.0 s | 44.0 s |
| Red PNO | $t_A$: | 4.4 s | 7.2 s | 20.0 s | 40.0 s | 70.0 s |

TABLE 5

Dependence of the half value time for the darkening of the various photosubstances and coatings on glass (compacted for 2 h at 130° C.) on the amount of crosslinking agent

| Photosubstance | | 10 mol % IDA | 15 mol % IDA | 20 mol % IDA | 25 mol % IDA | 30 mol % IDA |
|---|---|---|---|---|---|---|
| Blue A | $t_E$: | 1.6 s | 2.2 s | 5.0 s | 8.0 s | 13.0 s |
| Cl1 | $t_E$: | 1.2 s | 3.0 s | 7.4 s | 10.0 s | 16.0 s |
| PC3 | $t_E$: | 2.0 s | 2.6 s | 6.0 s | 8.0 s | 13.6 s |
| Cl2 | $t_E$: | 3.0 s | 6.0 s | 12.0 s | 20.0 s | 40.0 s |
| Photo L | $t_E$: | 5.6 s | 7.0 s | 8.4 s | 10.2 s | 14.0 s |
| Blue D | $t_E$: | 5.6 s | 8.0 s | 11.0 s | 18.0 s | 26.0 s |
| Red PNO | $t_E$: | 3.6 s | 5.0 s | 12.0 s | 20.0 s | 30.0 s |

TABLE 6

Dependence of the half value time for the brightening of the various photosubstances and coatings on glass (compacted for 2 h at 130° C.) on the amount of spacer

| Photosubstance | | 0 mmol PCF | 5 mmol PCF | 10 mmol PCF | 15 mmol PCF | 20 mmol PCF | 25 mmol PCF |
|---|---|---|---|---|---|---|---|
| Blue A | $t_A$: | 1.8 s | 2.8 s | 5.2 s | 6.4 s | 8.0 s | 10.8 s |
| Cl1 | $t_A$: | 1.2 s | 3.2 s | 3.6 s | 4.8 s | 6.4 s | 11.2 s |
| PC3 | $t_A$: | 1.8 s | 4.8 s | 5.6 s | 6.4 s | 12.8 s | 14.0 s |
| Cl2 | $t_A$: | 2.8 s | 5.6 s | 10.4 s | 11.2 s | 18.0 s | 22.8 s |
| Photo L | $t_A$: | 7.2 s | 9.0 s | 9.6 s | 13.2 s | 14.6 s | 16.8 s |
| Blue D | $t_A$: | 6.0 s | 10.4 s | 13.6 s | 20.0 s | 28.6 s | 35.2 s |
| Red PNO | $t_A$: | 4.4 s | 8.4 s | 15.0 s | 21.6 s | 24.8 s | 35.0 s |

TABLE 7

Dependence of the half value time for the darkening of the various photosubstances and coatings on glass (compacted for 2 h at 130° C.) on the amount of spacer

| Photosubstance | | 0 mmol PCF | 5 mmol PCF | 10 mmol PCF | 15 mmol PCF | 20 mmol PCF | 25 mmol PCF |
|---|---|---|---|---|---|---|---|
| Blue A | $t_E$: | 1.6 s | 2.6 s | 4.8 s | 5.6 s | 6.8 s | 9.2 s |
| Cl1 | $t_E$: | 1.2 s | 2.8 s | 3.6 s | 4.4 s | 6.0 s | 9.6 s |
| PC3 | $t_E$: | 2.0 s | 4.0 s | 5.6 s | 6.6 s | 11.2 s | 12.0 s |
| Cl2 | $t_E$: | 3.0 s | 5.2 s | 8.4 s | 9.6 s | 14.4 s | 17.4 s |
| Photo L | $t_E$: | 5.6 s | 6.0 s | 7.2 s | 9.0 s | 8.4 s | 10.8 s |
| Blue D | $t_E$: | 5.6 s | 8.8 s | 10.4 s | 17.6 s | 20.6 s | 22.4 s |
| Red PNO | $t_E$: | 3.6 s | 6.0 s | 9.6 s | 13.2 s | 14.4 s | 14.0 s |

What is claimed:

1. A photochromic coating composition comprising the following components:
   (a) a silicon-containing precondensate derived from:
      (i) at least one hydrolyzable silane A containing at least one hydrolysis-stable radical R having a functional group X that is capable of undergoing at least one of a thermally induced polymerization reaction and a photochemically induced polymerization reaction, and
      (ii) optionally, at least one additional hydrolyzable compound based on elements from the group consisting of Si, Al, Ti, Zr, Ta, Nb, Sn, Zn, W, and Ge;
   (b) at least one photochromic dye selected from the group consisting of spirooxazines and naphthopyrans;
   (c) at least one stabilizer selected from the group consisting of statically hindered phenols, sterically hindered hydroquinones sterically hindered pyrocatechols, and sterically hindered aromatic amines, organic phosphites, organic phosphonates, benzophenone derivatives, substituted benzotriazoles, cinnamic acid derivatives, salicylates, 3-(5-imidazolyl)acrylic acid, and ergosterol; and
   (d) nanoscale particles having an average particle size of not more than 200 nm; where the at least one stabilizer (c) comprises from 0.1 to 5.0% by weight, based on the total weight of components (a), (b) and (c).

2. A composition of claim 1 where the precondensate is derived least one silane A containing at least one hydrolysis-stable radical R having a functional group X that is an epoxide, mercapto, acrylyl, or methacrylyl group.

3. A composition of claim 1 where an at least one silane A is selected from compounds of the formula $R^1_x SiR^3_{3-x} R$, where:
   the radicals $R^1$ are the same or different and are selected from $C_{1-4}$ alkoxy, halogen, and acyl;
   the radicals $R^3$ are alkyl or aryl;
   the radical R is a hydrolysis-stable radical having a functional group X capable of undergoing at least one of a thermally induced polymerization reaction and a photochemically induced polymerization reaction; and
   x is 1, 2, or 3.

4. A composition of claim 3 where the radicals $R^1$ are selected from methoxy and ethoxy.

5. A composition of claim 1 where the radical R is selected from

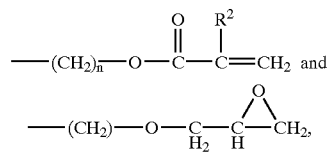

where
   $R^2$ hydrogen or methyl, and
   n is an integer from 1 to 6.

6. A composition of claim 5 where n is an integer from 2 to 4.

7. A composition of claim 1 where the silane A is
   3-glycidyloxypropyltrimethoxysilane,
   3-glycidyloxypropyltriethoxysilane,
   3-methacryloxypropyltrimethoxysilane, or
   3-methacryloxypropyltriethoxysilane.

8. A composition of claim 1 where the nanoscale particles (d) comprise particles of compounds selected from the group consisting of the oxides, nitrides, carbides, silicides, borides, and carbonitrides of Al, Si, Ti, Zr, Hf, W, Ga, Nb, Ta, Sn, Zn, and Ge.

9. A composition of claim 8 where the nanoscale particles (d) comprise nanoscale $SiO_2$ particles.

10. A composition of claim 1 where the at least one photochromic dye (b) comprises from 0.05 to 5% by weight, based on the total weight of components (a), (b), and (c).

11. A composition of claim 10 where the at least one photochromic dye (b) comprises from 0.1 to 2% by weight, and the at least one stabilizer comprises from 0.5 to 2.5% by weight, based on the total weight of components (a), (b), and (c).

12. A process for providing a substrate with a photochromic coating, comprising:
   coating the substrate with a coating composition of claim 1, and
   curing the coating composition.

13. A process of claim 12 further comprising adding a thermal and/or photochemical curing catalyst to the coating composition no later than immediately before application of the coating composition to the substrate.

14. A process of claim 12 where the substrate comprises plastic, glass, paper, textiles, metal, wood, stone, or ceramic.

15. A process of claim 12 where the substrate is intended to be exposed to varying irradiation with visible and/or UV light.

16. A composition of claim 1 where the nanoscale particles comprise from 2 to 100% by weight, based on the weight of component (a).

17. A composition of claim 16 where the nanoscale particles comprise from 5 to 50% by weight, based on the weight of component (a).

18. A process for providing a substrate with a photochromic coating, comprising:
   coating the substrate with a coating composition of claim 16, and
   curing the coating composition.

* * * * *

UNITED STATES PATENT AND TRADEMARK OFFICE
CERTIFICATE OF CORRECTION

PATENT NO. : 6,639,039 B1
DATED : October 28, 2003
INVENTOR(S) : Fries et al.

It is certified that error appears in the above-identified patent and that said Letters Patent is hereby corrected as shown below:

Column 17,
Lines 2-32, Claims 1 and 2, should read as follows:

1. A photochromic coating composition comprising the following components:
    (a) a silicon-containing precondensate derived from:
        i) at least one hydrolyzable silane A containing at least one hydrolysis-stable radical R having a functional group X that is capable of undergoing at least one of a thermally induced polymerization reaction and a photochemically induced polymerization reaction, and
        ii) optionally, at least one additional hydrolyzable compound based on elements from the group consisting of Si, Al, Ti, Zr, Ta, Nb, Sn, Zn, W and Ge;
    (b) at least one photochromic dye selected from the group consisting of spirooxazines and naphthopyrans;
    (c) at least one stabilizer selected from the group consisting of sterically hindered phenols, sterically hindered hydroquinones, sterically hindered pyrocatechols, and sterically hindered aromatic amines, organic phosphites, organic phosphonates, benzophenone derivatives, substituted benzotriazoles, cinnamic acid derivatives, salicylates, 3-(5-imidazolyl)acrylic acid, and ergosterol; and
    (d) nanoscale particles having an average particle size of not more than 200nm; where the at least one stabilizer (c) comprises from 0.1 to 5.0% by weight, based on the total weight of components (a), (b) and (c).

2. A composition of claim 1 where the precondensate is derived from at least one silane A containing at least one hydrolysis-stable radical R having a functional group X that is an epoxide, mercapto, acrylyl, or methacrylyl group.

UNITED STATES PATENT AND TRADEMARK OFFICE
CERTIFICATE OF CORRECTION

PATENT NO. : 6,639,039 B1
DATED : October 28, 2003
INVENTOR(S) : Fries et al.

It is certified that error appears in the above-identified patent and that said Letters Patent is hereby corrected as shown below:

Column 17, cont'd,
Lines 46-55, Claim 5 should read as follows:

5. A composition of claim 1 where the radical R is selected from

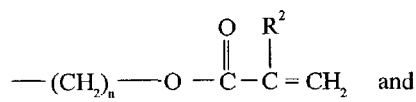

and

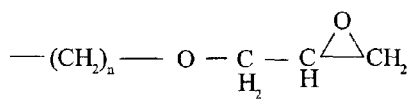

where $R^2$ is hydrogen or methyl, and n is an integer from 1 to 6.

Signed and Sealed this

Twenty-third Day of March, 2004

JON W. DUDAS
*Acting Director of the United States Patent and Trademark Office*